United States Patent
King

(10) Patent No.: US 8,985,216 B2
(45) Date of Patent: Mar. 24, 2015

(54) HYDRAULIC SHOCK ABSORBER FOR SLIDING SLEEVES

(75) Inventor: James G. King, Kingwood, TX (US)

(73) Assignee: Baker Hughes Incorporated, Houston, TX (US)

(*) Notice: Subject to any disclaimer, the term of this patent is extended or adjusted under 35 U.S.C. 154(b) by 548 days.

(21) Appl. No.: 13/355,272

(22) Filed: Jan. 20, 2012

(65) Prior Publication Data

US 2013/0186635 A1 Jul. 25, 2013

(51) Int. Cl.
*E21B 34/14* (2006.01)
*F16F 9/10* (2006.01)
*E21B 34/00* (2006.01)

(52) U.S. Cl.
CPC ........... *E21B 34/14* (2013.01); *E21B 2034/007* (2013.01); *F16F 9/10* (2013.01)
USPC ................... 166/332.1; 166/334.1; 166/334.4

(58) Field of Classification Search
USPC ..................... 166/332.1, 334.1, 334.4; 251/52
See application file for complete search history.

(56) References Cited

U.S. PATENT DOCUMENTS

| | | | | |
|---|---|---|---|---|
| 4,055,338 A | * | 10/1977 | Dyer | 267/125 |
| 4,195,950 A | | 4/1980 | Goldman | |
| 4,394,884 A | * | 7/1983 | Skipper | 175/321 |
| 4,754,812 A | * | 7/1988 | Gentry | 166/313 |
| 5,083,623 A | * | 1/1992 | Barrington | 175/321 |
| 5,183,113 A | * | 2/1993 | Leaney et al. | 166/316 |
| 5,549,161 A | | 8/1996 | Gomez et al. | |
| 6,079,496 A | * | 6/2000 | Hirth | 166/321 |
| 7,108,067 B2 | | 9/2006 | Themig et al. | |
| 7,779,907 B2 | | 8/2010 | Wagner et al. | |
| 2009/0266659 A1 | | 10/2009 | Lembcke et al. | |

OTHER PUBLICATIONS

Weatherford. "Openhole Completion Systems". 2009. Slides 30-31 PDF.*

* cited by examiner

*Primary Examiner* — David Bagnell
*Assistant Examiner* — Tara Schimpf
(74) *Attorney, Agent, or Firm* — Steve Rosenblatt

(57) ABSTRACT

A sliding sleeve has an associated shock absorber to limit shock loading to the shifting apparatus when the end of travel is reached. An adjacent sleeve defined an annular cavity in a manner that does not reduce the drift dimension of the shifting sleeve. The cavity has a fluid in it and the movement of the shifted sleeve causes the movement of the shock absorber sleeve to reduce the fluid volume in the annular cavity. The volume reduction forces fluid through a restriction to regulate the speed of the sliding sleeve as a travel stop is reached. The fluid can be a gas, an incompressible fluid or grease. The restriction can be temporarily covered such as with a rupture disc. Room to compensate for thermal expansion can be provided in the annular space.

16 Claims, 2 Drawing Sheets

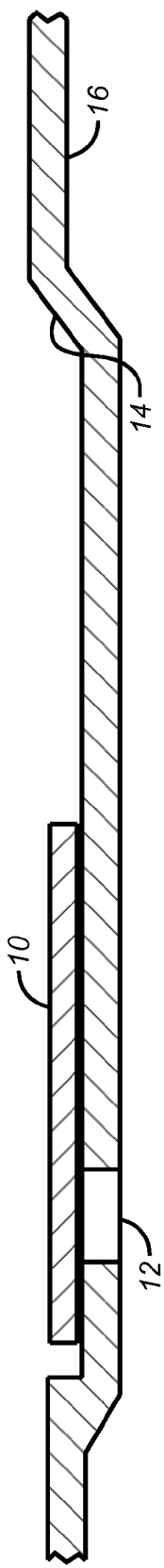
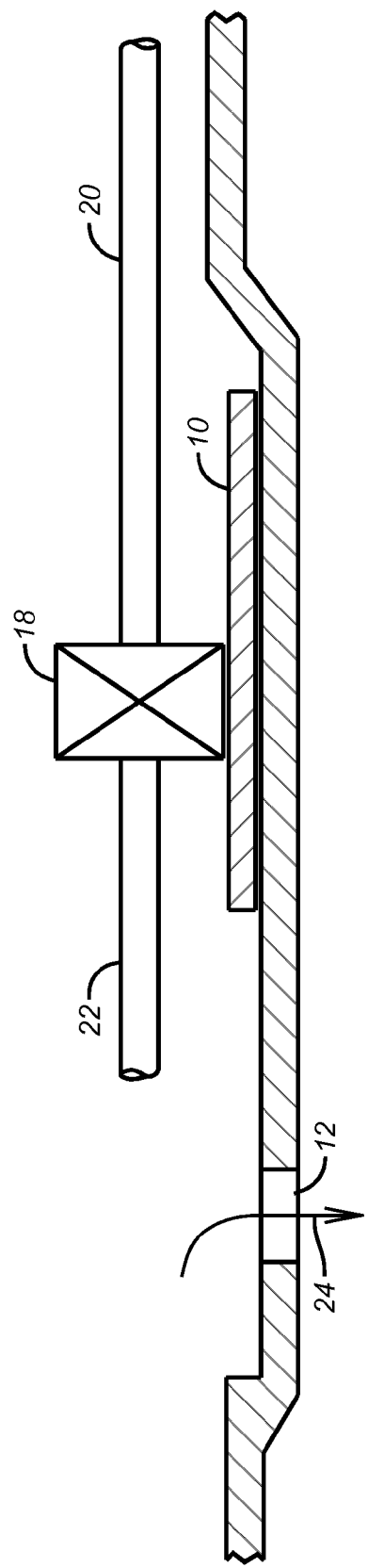

HYDRAULIC SHOCK ABSORBER FOR SLIDING SLEEVES

FIELD OF THE INVENTION

The field of the invention is sliding sleeves for subterranean use and more particularly an effective shock absorption device for pressure shifted sleeves.

BACKGROUND OF THE INVENTION

Sliding sleeves valves provide selective access outside a tubing string for a variety of applications. One popular application is for formation access for fracturing. In the past these sliding sleeves were shifted in a variety of ways in a fracturing application. The sliding sleeves could have integral ball seats that get progressively larger from further downhole and in an uphole direction. The fracturing proceeded from bottom up and each time a bigger ball was dropped to land on the next higher sliding sleeve while isolating any previous sleeves shifted open in the same manner. When the fracturing is complete the well is put on production and the theory is that the balls on the seats are simply carried up to the surface past all the seats above their original location. This does not always happen and logjams can occur that can impede subsequent production.

As an alternative to using ball seats of gradually increasing size from well bottom to the surface a different shifting technique has been developed. One such device is the Multi-stage Unlimited Frac Isolation System from NCS Energy Service Inc. which combines a locator for finding the sliding sleeve with a bottom hole assembly and a resettable packer that can be set against the sleeve. Pressure is applied with the packer against the sleeve and the sleeve shifts to open a wall port. A ported sub is opened in the coiled tubing string and the fracturing fluid is delivered through the annulus to the port opened by the shifted sliding sleeve while the coiled tubing can be used as a dead string to measure fracturing pressure or it can be used to circulate or reverse circulate in the event of a screenout. An animation of this system is available on the NCS website.

One issue with this system is that the acceleration and abrupt deceleration of the sliding sleeve as it hits a travel stop has created stress failures in the coiled tubing or related fittings adjacent the packer that grabs the sliding sleeve. These failures have brought about a proposed solution for a shock absorber for the sliding sleeve that crumples a bellows on travel stop impact as illustrated in US Publication 2009/0266659. A related crumpling type shock absorber for a dropped string in a hole is shown in U.S. Pat. No. 7,779,907. There are limitations to the crumple design for a sliding sleeve and those are that the drift diameter is reduced from the crumpling so that travel of other tools past a sliding sleeve could be impeded and that the crumpling may stick the sleeve in the position before it is fully shifted or prevent the sleeve from being shifted in the reverse direction should there be a need to close the port with the sliding sleeve.

Other applications for shock absorbers have involved annular rubber rings that simply get compressed and bounce back after the shock loading is removed. These have been used in sliding sleeves that are closed with a mechanical shifting tool such as item 104 in FIG. 11 B of U.S. Pat. No. 5,549,161. On a much larger scale large annular rubber shapes have been used on jack-up rig legs such as item 46 in U.S. Pat. No. 4,195,950. Of general interest as to sliding sleeves is U.S. Pat. No. 7,108,067.

What is needed and provided by the present invention is a hydraulic shock absorber for a sliding sleeve that does not reduce drift and that addresses the stress failure in the coiled tubing and associated components from shock loading at the end of the movement of the sliding sleeve. Those skilled in the art will better understand additional aspects of the present invention from a description of the preferred embodiment and the associated drawings with the understanding that the full scope of the invention is given by the appended claims.

SUMMARY OF THE INVENTION

A sliding sleeve has an associated shock absorber to limit shock loading to the shifting apparatus when the end of travel is reached. An adjacent sleeve defined an annular cavity in a manner that does not reduce the drift dimension of the shifting sleeve. The cavity has a fluid in it and the movement of the shifted sleeve causes the movement of the shock absorber sleeve to reduce the fluid volume in the annular cavity. The volume reduction forces fluid through a restriction to regulate the speed of the sliding sleeve as a travel stop is reached. The fluid can be a gas, an incompressible fluid or grease. The restriction can be temporarily covered such as with a rupture disc. Room to compensate for thermal expansion can be provided in the annular space.

BRIEF DESCRIPTION OF THE DRAWINGS

FIG. 1 shows an existing sliding sleeve design in the port closed position;

FIG. 2 show an existing method of engaging a packer run on coiled tubing to the sliding sleeve to shift the sliding sleeve with pressure;

DETAILED DESCRIPTION OF THE PREFERRED EMBODIMENT

Figure 3:
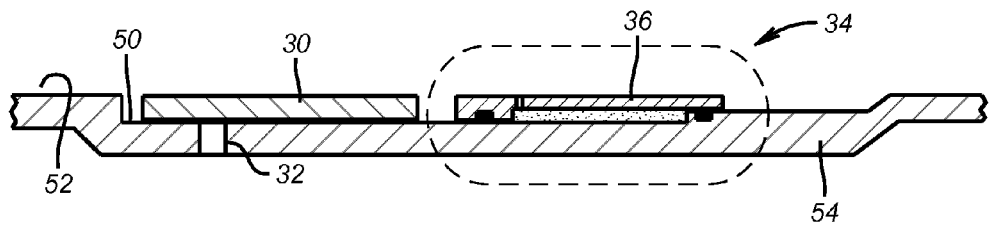
FIG. 3 shows a sliding sleeve with a shock absorber in the closed position.

The known sliding sleeve 10 design is shown in FIG. 1 with the port 12 in the closed position and the sleeve 10 disposed in a recess 14 so as not to reduce the drift diameter of the tubular string 16. One way to move the sleeve 10 to the open position is with a resettable packer such as an inflatable packer 18 that is delivered to the sleeve 10 on a coiled tubing string 20. Below the packer 18 is a coiled tubing extension 22 leading to a locating tool that is well known in the art for proper placement of the packer 18 in alignment with the sleeve 10 for shifting the sleeve 10 to the open position shown in FIG. 2. At this point the fracturing can begin through port 12 as indicated by arrow 24.

The problem with the shifting device in FIG. 2 was that stress cracks and failures were experienced in the coiled tubing 20 and connections in the vicinity of the packer 18. As mentioned previously the crush type shock absorbers were tried but the design had drawbacks such as a reduction of the drift dimension after the crushing and the potential of getting in the way of trying to operate the now open sleeve such as 10 back to the position where the port 12 was closed.

Figure 4:
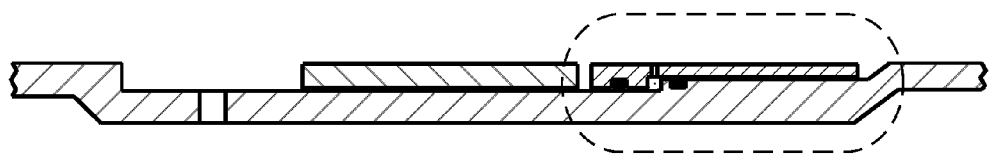
FIG. 4 shows the sliding sleeve of FIG. 3 in the open position.
Figure 5:
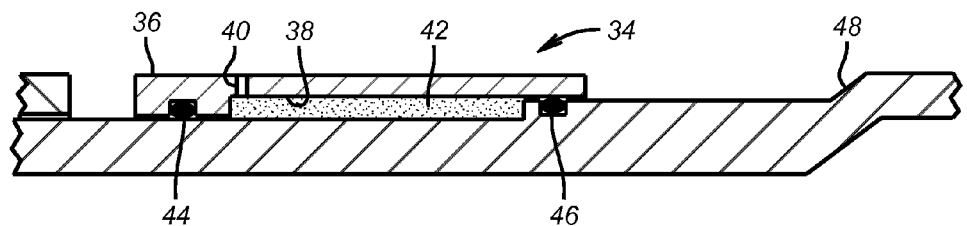
FIG. 5 is a detailed view of the shock absorber with the sleeve in the closed position.
Figure 6:
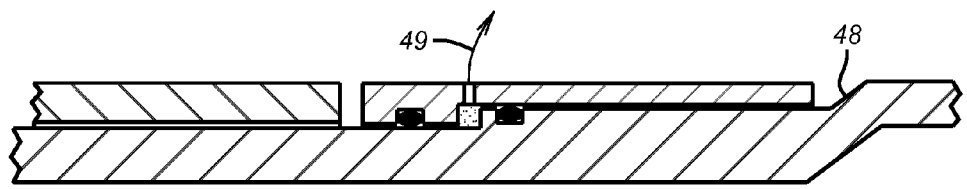
FIG. 6 is a detailed view of the shock absorber with the sleeve in the open position.

FIGS. 3-6 illustrate a sliding sleeve 30 to cover a port 32 in housing 54 and to be operated by the same packer 18 on coiled tubing 20 as shown in FIG. 2. Other shifting tools delivered by conveyances different than coiled tubing 20 are also contemplated. The shock absorber assembly 34 is best seen in detail in FIGS. 3 and 5 for the closed position of the port 32. It is an annular sleeve 36 with an internal recess 38 to define a variable volume 42 that has an outlet 40. Seals 44 and 46 allow the sleeve 36 to move and reduce the volume 42 and as a result build pressure inside to expel the fluid contents 49 through the vent 40. The vent 40 can be open or it can have a removable barrier such as a rupture disk or a floating piston that can move in opposed directions to compensate for thermal expansion and contraction before getting expelled when pressure builds in volume 42 as the volume decreases. The volume decrease occurs as a result of the sleeve 30 bumping the sleeve 36 when actuated such as in the manner shown in FIG. 2. Sleeve 36 can move up to the travel stop 48 or to a location short of stop 48. The volume 42 can contain grease, an incompressible liquid or gas or combinations. The material can have Newtonian or Non-Newtonian characteristics. A gas layer above a liquid can also act as a thermal expansion compensation system in lieu of a device placed in the passage 40 such as a floating piston or rupture disc, either of which can blow out with the fluid from the volume 42 as the sliding sleeve 30 drives the shock absorber. Both the sliding sleeve 30 and the shock absorber sleeve 36 are in a recess 50 so that neither reduces the drift diameter such as at 52. In other words, the internal diameter of sleeve 36 is at least as large as the internal diameter of sleeve 30.

The above description is illustrative of the preferred embodiment and many modifications may be made by those skilled in the art without departing from the invention whose scope is to be determined from the literal and equivalent scope of the claims below:

I claim:

1. An assembly of a sliding sleeve and a shock absorber for use in a subterranean location comprising:
    a housing having at least one selectively covered open wall opening by a sliding sleeve surrounding a passage through said housing, said passage defined by a drift dimension that is the smallest dimension for tool passage through said housing;
    a hydraulic shock absorber surrounding said passage actuated by initial movement of said sliding sleeve into contact with said hydraulic shock absorber to then move said shock absorber to absorb the impact from said sliding sleeve;
    said shock absorber defining a variable volume adjacent said passage;
    said variable volume is formed between a sleeve movable upon impact from said sliding sleeve and said housing, movement of said sleeve directly reduces said variable volume;
    said sleeve and said sliding sleeve have an internal diameter at least as large as said drift dimension.

2. The assembly of claim 1, wherein:
said passage has a drift diameter adjacent at least one end connection and said hydraulic shock absorber is disposed about said passage in a manner that does not reduce said drift diameter.

3. The assembly of claim 1, wherein:
said sliding sleeve impacts said shock absorber when shifted between a first and second positions.

4. The assembly of claim 1, wherein:
said shock absorber retards movement of said sliding sleeve by dissipating pressure built up internally in said shock absorber through a restriction.

5. The assembly of claim 1, wherein:
said shock absorber displaces at least one of gas, incompressible liquid and grease.

6. The assembly of claim 1, wherein:
said variable volume comprises at least one of gas, incompressible liquid and grease.

7. The assembly of claim 1, wherein:
said variable volume comprises at least one of a Newtonian and a non-Newtonian material.

8. The assembly of claim 1, wherein:
said sleeve has an internal diameter at least as large as said sliding sleeve.

9. The assembly of claim 8, wherein:
said sliding sleeve and said shock absorber are disposed in a recess in said housing so that both are outside said passage.

10. The assembly of claim 9, wherein:
said sleeve and said sliding sleeve are initially spaced apart before movement of said sliding sleeve.

11. The assembly of claim 9, wherein:
said sliding sleeve impacts said shock absorber when shifted between a first and second positions.

12. The assembly of claim 11, wherein:
said shock absorber retards movement of said sliding sleeve by dissipating pressure built up internally in said shock absorber through a restriction.

13. The assembly of claim 12, wherein:
said variable volume comprises at least one of gas, incompressible liquid and grease.

14. The assembly of claim 13, wherein:
said variable volume comprises an outlet with a frangible member or a floating piston that clear said outlet when said variable volume decreases.

15. The assembly of claim 1, wherein:
said variable volume comprises an outlet with a frangible member or a floating piston that clear said outlet when said variable volume decreases.

16. The assembly of claim 1, wherein:
said sliding sleeve and said shock absorber are initially in contact for tandem movement with respect to said port.

* * * * *